United States Patent [19]

Kissick

[11] 4,145,069
[45] Mar. 20, 1979

[54] SUPPORT SYSTEM FOR A WHEELED VEHICLE

[76] Inventor: Russell P. Kissick, 391 Greenwell Rd., Cincinnati, Ohio 45238

[21] Appl. No.: 803,949

[22] Filed: Jun. 6, 1977

[51] Int. Cl.² ............................................. B62H 1/02
[52] U.S. Cl. ..................................... 280/303; 248/359
[58] Field of Search ............... 280/293, 297, 298, 300, 280/301, 303; 180/30; 248/169, 171, 359; 254/86 H

[56] References Cited

U.S. PATENT DOCUMENTS 619,696  2/1899  Roby ................................ 280/303 X

FOREIGN PATENT DOCUMENTS

608349  1/1935  Fed. Rep. of Germany ........... 280/296
1089095  3/1955  France ................................. 280/303

Primary Examiner—Joseph F. Peters, Jr.
Assistant Examiner—Michael Mar
Attorney, Agent, or Firm—James W. Pearce; Roy F. Schaeperklaus

[57] ABSTRACT

A support system for a wheeled vehicle. A housing is mounted on the vehicle. A pair of support arms is pivotally mounted on the housing. Wheels mounted on the support arms can engage a supporting surface. A crank arm is attached to each support arm. An actuator advances transversely of pivots of the support arms. The crank arms are linked to the actuator. A locking arm releasably connects pivots between the links and the crank arms to hold the support arms in a vehicle supporting position.

8 Claims, 17 Drawing Figures

SUPPORT SYSTEM FOR A WHEELED VEHICLE

This invention relates to a support system or stand for a wheeled vehicle such as a motorcycle or the like. More particularly, this invention relates to a power operated and lockable side-lean-limiting support system.

An object of this invention is to provide a power operated and lockable side-lean-limiting support system for a motorcycle provided with support arms which swing between a raised limit position free of a supporting surface and a lowered position in engagement with the supporting surface.

A further object of this invention is to provide such a system which can be actuated by switch controls.

A further object of this invention is to provide such a system in which the supports carry wheels and in which the support arms can be held in an intermediate position as selected and at which the wheels are positioned to be spaced at a distance as selected above the supporting surface when the vehicle is in upright position.

Briefly, this invention provides a support system or stand for a wheeled vehicle such as a motorcycle or the like. The support includes a pair of support arms. The support arms are pivotally mounted on the vehicle. An appropriate hydraulic motor or the like swings the support arms between a raised limit running position and a lowered support limit position. A locking arm prevents swinging of the support arms from lowered position until released by a release cylinder. The locking member can engage a stop member to hold the support arms in an intermediate position.

The above and other objects and features of the invention will be apparent to those skilled in the art to which this invention pertains from the following detailed description and the drawings, in which:

In the following detailed description and the drawings, like reference characters indicate like parts.

Figure 1:
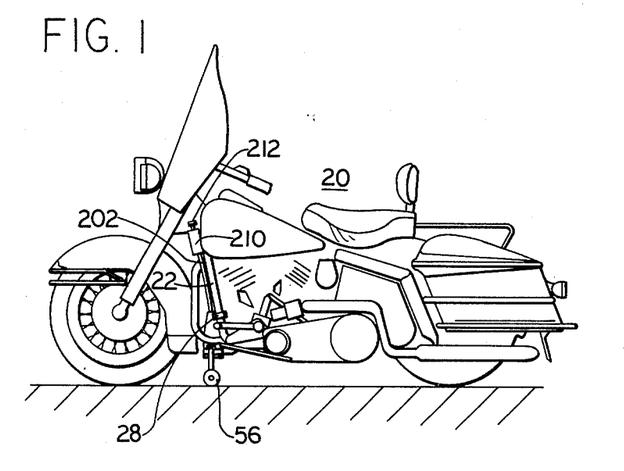
FIG. 1 is a view in side elevation of a motorcycle which is equipped with a support system constructed in accordance with an embodiment of this invention.
Figure 2:
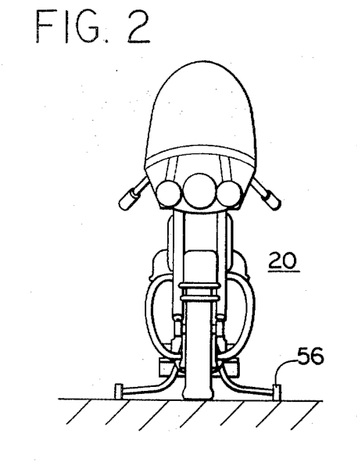
FIG. 2 is a view in front elevation of the motorcycle shown in FIG. 1.
Figure 4:
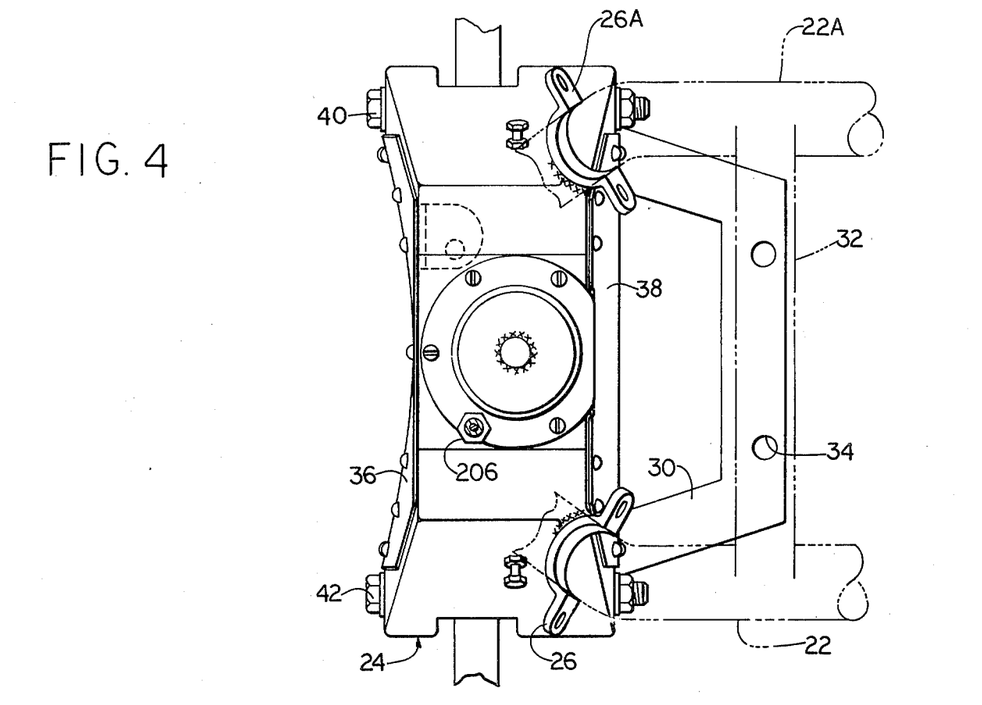
FIG. 4 is a top plan view of the main housing shown in FIG. 3.

In FIGS. 1 and 2 is shown a motorcycle 20 provided with frame elements 22 and 22A (FIGS. 4 and 7) on which a housing 24 is mounted. Clamp members 26 and 26A are mounted on the housing 24 and receive the frame elements 22 and 22A, respectively. Cooperating clamp members 28, one of which is shown in FIG. 1, are attached to the clamp members 26 and 26A by appropriate fasteners (not shown in detail) to attach the housing 24 to the frame elements 22 and 22A. A base member 29 closes a lower portion of the housing 24 and includes a base extension 30, which is attached to a cross frame 32 of the motorcycle by fasteners (not shown) received in openings 34 (FIG. 4) in the base extension. Face plates 36 and 38 close front and rear portions of the housing 24.

Figure 3:
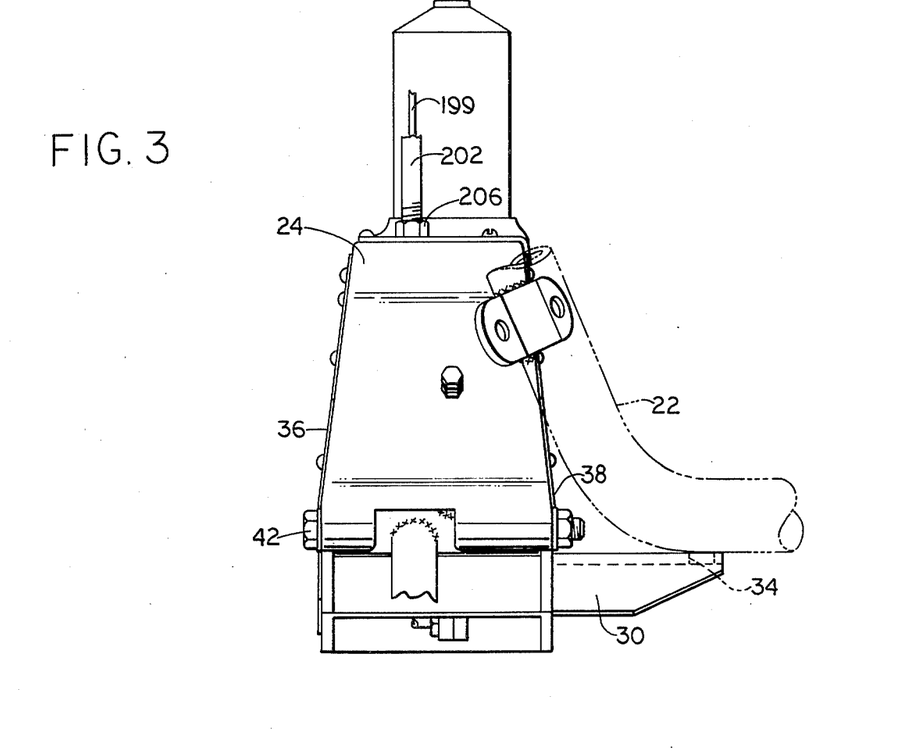
FIG. 3 is a view in side elevation of a main housing of the system, a fragmentary portion of a frame of the motorcycle being shown in triple-dot-dash lines.

Horizontal pivot bolts 40 and 42 (FIGS. 3 and 9) are mounted in the housing 24 and serve as pivots for lever members 44 and 46, respectively. The lever members 44 and 46 are similar in construction, and only the lever member 46 will be described in detail.

Figure 8:
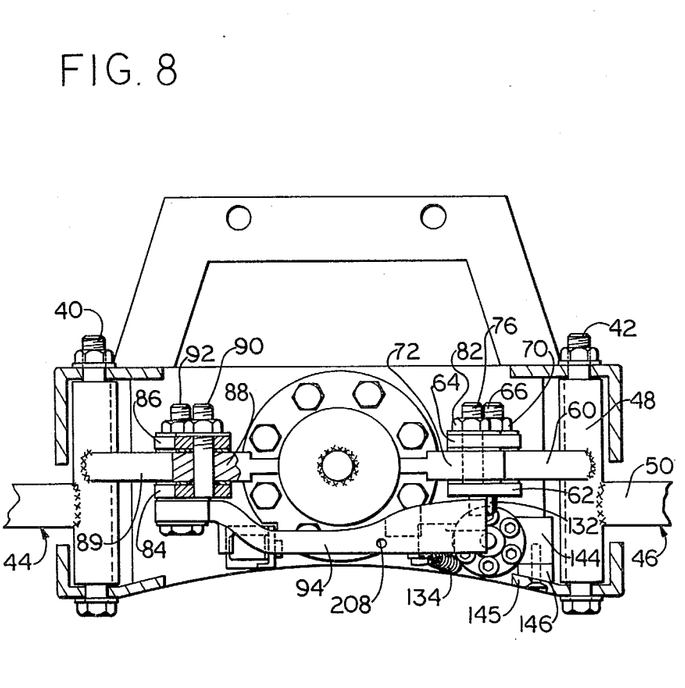
FIG. 8 is a top plan view of the housing with parts being broken away showing the operating levers in the guide wheel down position.

The lower member 46 includes a sleeve 48 rotatably mounted on the pivot bolt 42. An elongated tubular wheel-support arm 50 includes a first section 52 attached to and extending radially of the sleeve 48. A second section 54 of the support arm 50 extends at an oblique angle to the first section 52. A wheel 56 is rotatably mounted on the second section 54. The wheel 56 can engage a supporting surface 58 when in a lowered position as shown in full lines in FIG. 9. A short crank arm 60 is attached to and extends radially of the sleeve 48 in a direction opposed to the first section 52 of the support arm 50. Links 62 and 64 (FIG. 8) are pivotally connected to the crank arm 60. A stud 66 is mounted in the link 62 and extends through an opening 67 in the short crank arm 60 and through an opening (not shown) in the link 64 to receive a nut 70 (FIG. 8). The links 62 and 64 are pivotally connected to first lug or ear 72 that is mounted on a sliding sleeve member 74. A stud 76 mounted in the link 62 extends through an opening 78 in the lug 72 and through an opening (not shown) in the link 64. A nut 82 threaded on the stud 76 holds the links 62 and 64 and the lug 72 in assembled relation. A similar pair of links 84 and 86 connect a second lug 88 of the sliding sleeve member 74 to a short crank arm 89 of the lever member 44. A stud 90 mounted in the link 84 forms a pivot between the lug 88 and the links 84–86. A pivot bolt 92 forms the pivot between the short crank arm 89 and the links 84–86. A locking arm or lever 94 is also pivotally mounted on the pivot bolt 92. Adjustable stop bolts 96 and 98 are threaded in openings 99 in the housing 24 and limit outward swinging of head ends of the short crank arms 89 and 60, respectively.

The sliding sleeve member 74 is mounted for sliding lengthwise of a cylindrical guide 100. An inner cylinder 102, which is coaxial with the sliding sleeve member 74 and the cylindrical guide 100, receives a piston 103. The piston 103 is connected to the sliding sleeve 74 by a piston rod 104. The piston rod 104 extends through an upright opening 105 in a resilient washer 106. An inner edge of a partial cone shaped head portion 107 of the sliding sleeve member 74 is attached to an upper end portion of the piston rod 104. A compression spring 108 holds the washer 106 tightly against a partial cone shaped head 110 of the cylindrical guide 100. The cylindrical guide 100 and the inner cylinder 102 are mounted on a pad 112, which is attached to the base member 29 by bolts 114. A disc 116, which is attached to the pad 112, closes the lower end of the inner cylinder 102. A ring 118, which is also attached to the pad 112 extends between the inner cylinder 102 and the cylindrical guide 100 and closes the lower end of the cylindrical guide 100. A first hydraulic fluid entry fitting 120 communicates with the interior of the inner cylinder 102. A second hydraulic fluid entry fitting 122 communicates with a chamber 123 between the inner cylinder 102 and the cylindrical guide 100. Openings 124 in the upper portion of the inner cylinder 102 permit entry of the hydraulic fluid from the space 123 into the inner cylinder 102 above the piston 103. A plate 126 on which the spring 108 is supported closes the upper end of the inner cylinder 102. A first fluid line 128 (FIG. 10) is connected to the first entry fitting 120, and a second fluid line 130 is connected to the second entry fitting 122. When fluid under pressure is introduced through the first fluid line 128, the sliding sleeve member 74 is driven upwardly to lower the wheels 56 to the FIGS. 1, 2 and full line position of FIG. 9. When fluid under pressure is introduced through the second fluid line 130, the sliding sleeve member 74 is driven downwardly to raise the wheels to the double-dot-dash line position 56A of FIG. 9. Sufficient clearance is provided between the sliding sleeve 74 and the cylindrical guide 100 to permit discharge of air from the upper portion of the sliding sleeve 74.

Figure 5:
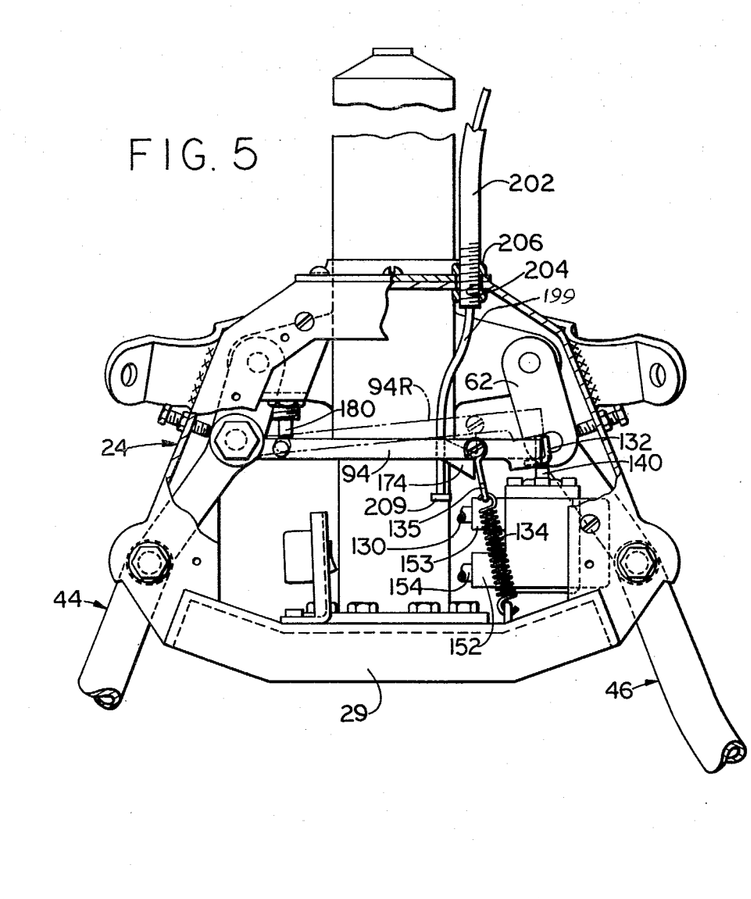
FIG. 5 is a view in front elevation of the housing with a front plate thereof being broken away to reveal details of construction, operating levers thereof being shown in a guide wheel down position.
Figures 9, 10:
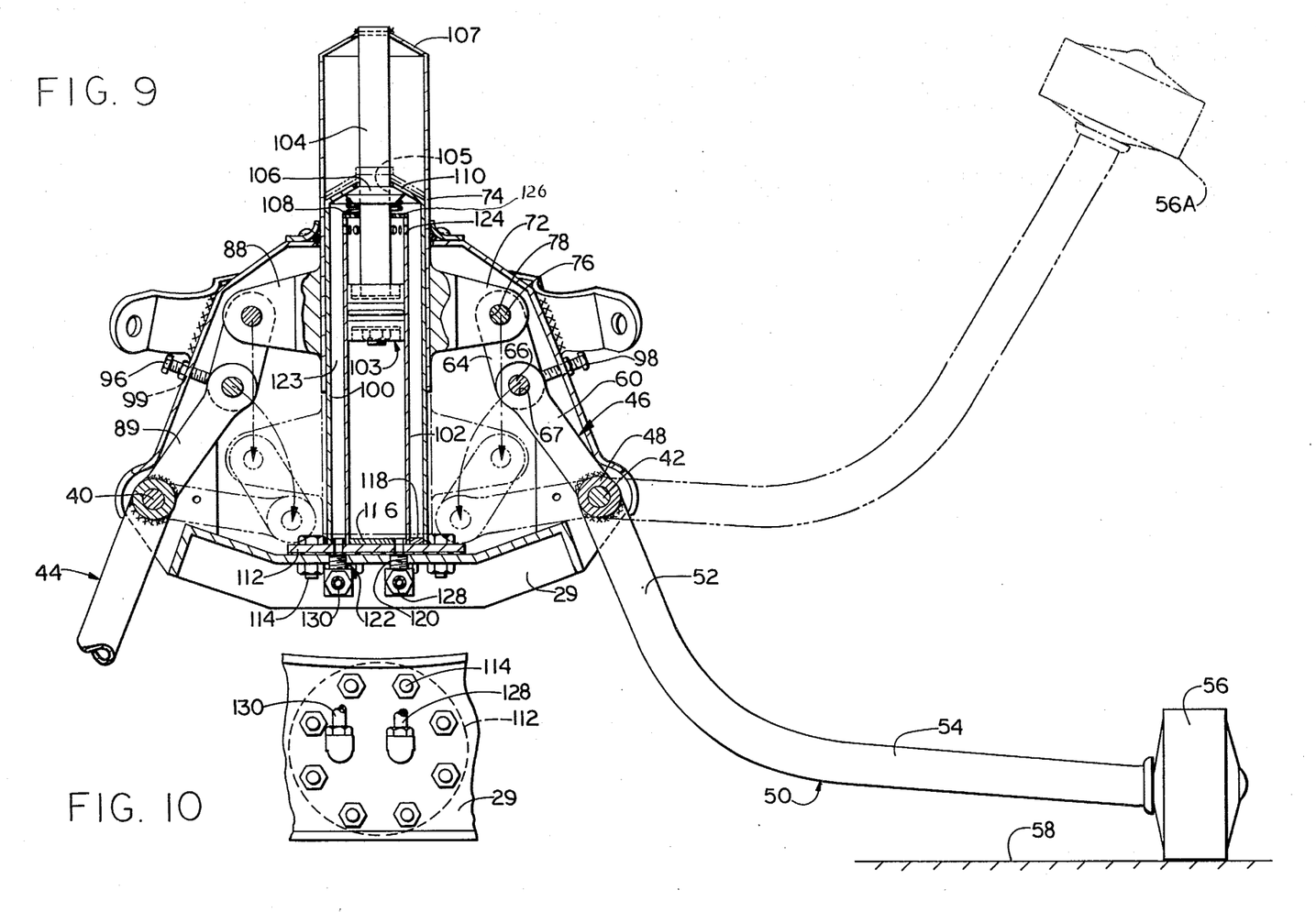
FIG. 9 is a front view of the housing in generally transverse section, a support arm thereof being shown in guide wheel down position in full lines and in guide wheel up limit position in double-dot-dash lines, locking members being omitted for clarity.
FIG. 10 is a fragmentary bottom plan view of the housing.

When the wheels 56 are in the lowered full line position of FIG. 9, linkages are releasably connected locked in position by interaction of the locking arm 94 and the link 62 (FIGS. 5 and 8). The link 62 carries a lock angle 132, which receives a head end portion of the locking arm 94 as shown in FIGS. 5 and 8. A tension spring 134 urges the locking arm 94 into locking position. The upper end of the spring 134 is supported by a hook member 135 carried by a fastener 136 mounted on the locking arm 94. A spring support 138 mounted on the housing 29 supports the lower end of the spring 134.

Figure 11:
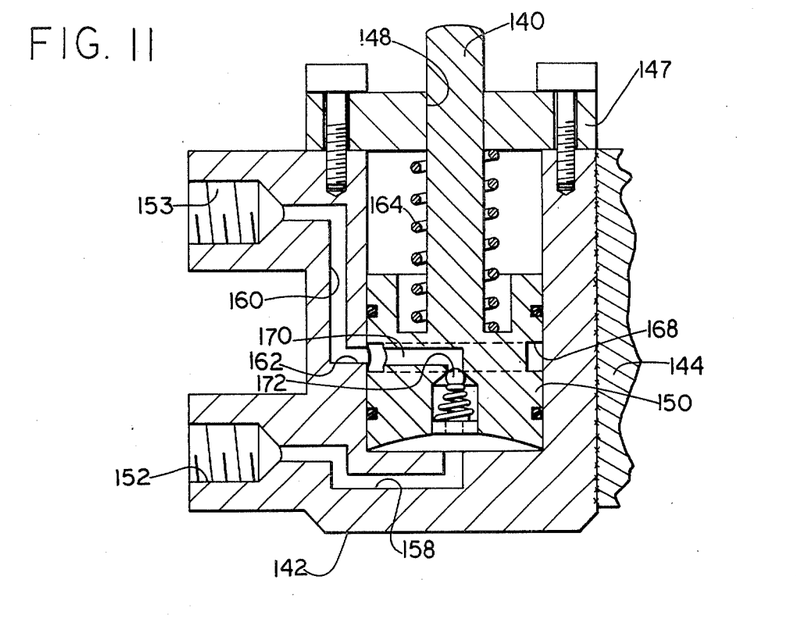
FIG. 11 is a somewhat schematic view in upright section of a pilot cylinder of the support system in lowered position.
Figure 12:
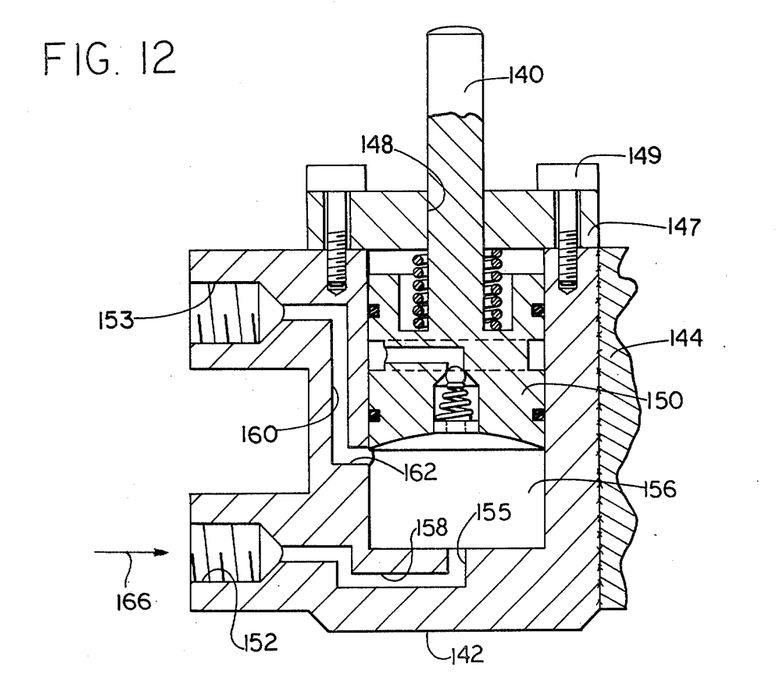
FIG. 12 is a somewhat schematic view in upright section of the pilot cylinder with a piston thereof in raised position.
Figure 13:
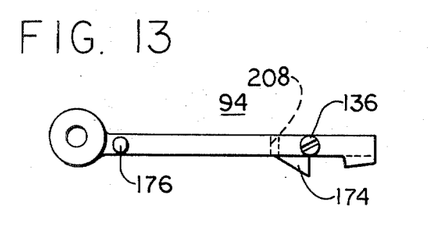
FIG. 13 is a view in side elevation of a locking lever of the system.
Figure 14:
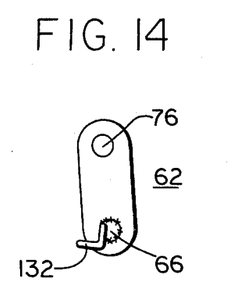
FIG. 14 is a view in side elevation of a locking link of the system.
Figure 15:
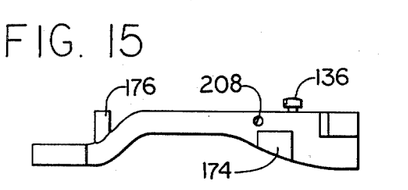
FIG. 15 is a bottom plan view of the locking lever shown in FIG. 13.

The locking arm 94 can be released by action of a piston rod 140, which operates in a cup-shaped cylinder body 142. The cylinder body 142 carries a block 144, which is attached to a mounting block 146 attached to a flange 145 of the housing 29 (FIG. 8). Details of construction of the cylinder body 142 are shown in FIGS. 11 and 12. The cylinder body 142 is closed by a cap 147. The piston rod 140 extends through a guide hole 148 in the cap 147. Screw fasteners 149 attach the cap 147 to the cylinder body 142. A piston 150, which carries the piston rod 140, moves inside the cylinder body 142 between a lowered position shown in FIG. 11 and a raised position shown in FIG. 12.

Fluid can enter the cylinder body 142 through a first port 152 and a second port 153. As shown in FIG. 5, the first port 152 is connected to a line 154, and the second port 153 is connected to the line 130. The line 130 (FIG. 10) is connected to the chamber 123 (FIG. 9). The first port 152 (FIGS. 11 and 12) is connected to a port 155 at the center of the bottom of a chamber 156 of the cylinder body 142 by a channel 158 to supply fluid under pressure beneath the piston 150. The second port 153 is connected by a channel 160 to a port 162 in the wall of the chamber 156 spaced between the top and bottom of the chamber 156. A compression spring 164 urges the piston to the FIG. 11 position. When fluid is directed into the first port 152, as indicated by the arrow 166 in FIG. 12, the piston 150 is raised to the position shown in FIG. 12 at which fluid passes through the chamber 156 to be discharged through the second port 153 and the line 130. When the pressure beneath the piston 150 is released, the compression spring 164 returns the piston 150 to the FIG. 11 position at which a circular slot 168 and a channel 170 in the piston 150 are in communication with the port 162, channel 160 and the second port 153. Then, as fluid under pressure is introduced through the second port 153, the fluid passes through the channel 160, the slot 168, the channel 170, a check valve 172 and the channel 158 to be discharged through the first port 152 and the line 154. The check valve 172 permits downward flow but prevents upward flow through the piston 150. Thus, when fluid under pressure is introduced as indicated by the arrow 166, the piston 150 and the piston rod 140 are raised.

Figure 6:
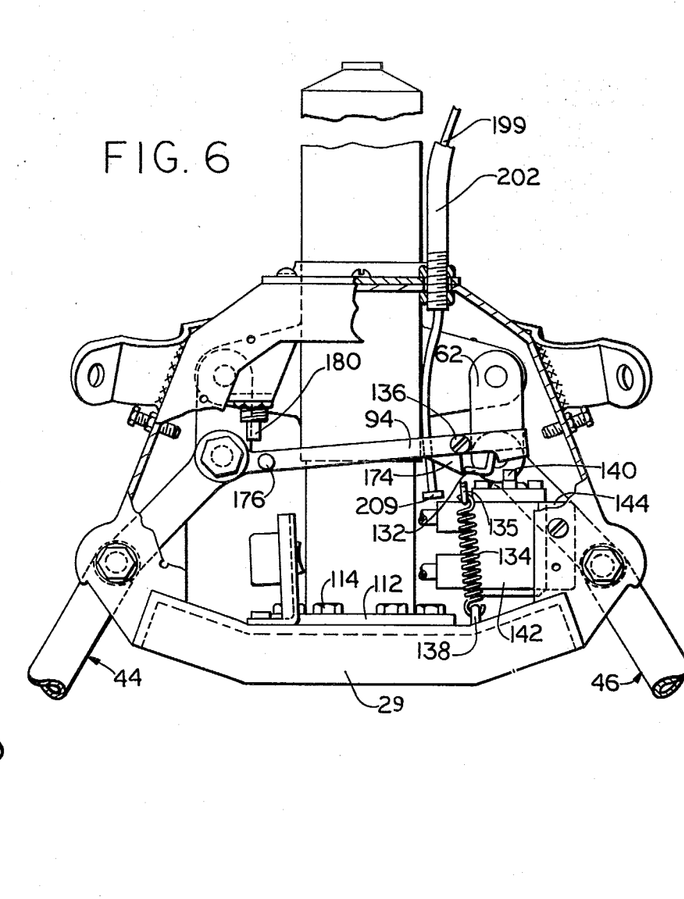
FIG. 6 is a view in front elevation of the housing with a front plate thereof being partly broken away to reveal the operating levers in an intermediate locked position.
Figure 7:
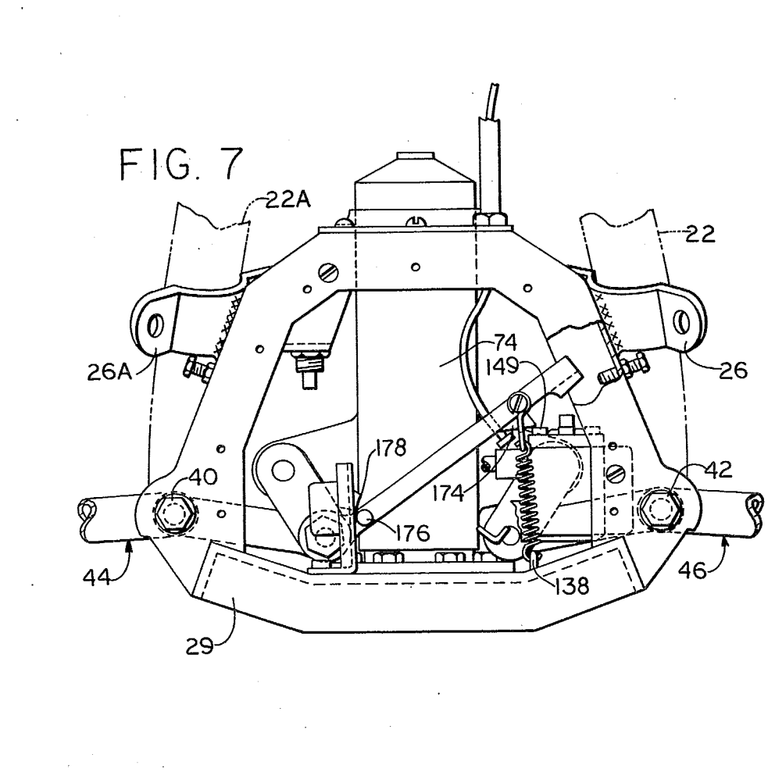
FIG. 7 is a view in front elevation of the housing with portions broken away to reveal the operating levers in a guide wheel raised position.
Figure 16:
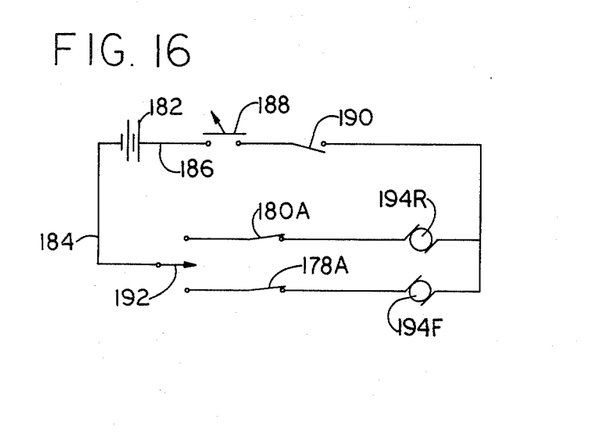
FIG. 16 is a schematic electrical circuit diagram thereof.

When the piston rod 140 is raised, the locking arm 94 is swung to the dot-dash line position indicated at 94R in FIG. 5 so that, as fluid enters the chamber 123 (FIG. 9), the piston 103 can move downwardly to raise the wheels 56. If the pressure is released when linkages are at an intermediate position as shown in FIG. 6 at which the wheels are partially raised, the lock angle 132 engages a lug 174 on the locking lever 94 to lock the linkages mechanically in the intermediate position of FIG. 6. If pressure in wheel-raising direction is continued, the wheels swing up to the raised double-dot-dash position 56A of FIG. 9. At this position, the lug 174 rests on one of the screw fasteners 149 as shown in FIG. 7. When the wheels are in the full up position, a pin 176 mounted in the locking lever 94 engages a switch actuator 178 of a switch 178A (FIG. 16) to open the switch 178A. When the wheels swing downwardly as fluid is introduced through the line 128 into the lower end of the inner cylinder 102 (FIG. 9), the pin 176 (FIG. 7) swings upwardly and the switch actuator 178 moves to its other position and the contacts of the switch 178A close. When the locking lever 94 reaches the FIG. 5 full line position, the locking lever 94 engages a switch actuator 180 to open contacts of a switch 180A (FIG. 16).

Figure 17:
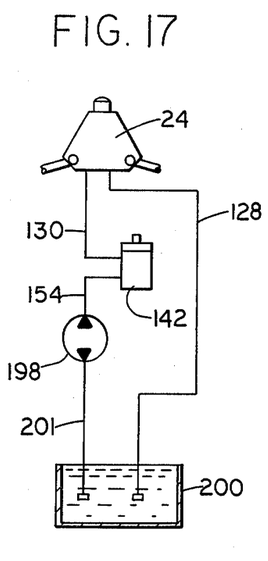
FIG. 17 is a schematic hydraulic circuit diagram thereof.

Operation of the device will now be described with reference to FIG. 16, which shows electrical connections, and FIG. 17, which shows hydraulic connections. Electric power is supplied by an appropriate battery 182 (which may be the vehicle battery forming part of the vehicle's electrical system) to leads 184 and 186. The electrical portion of the system is inoperative until an on-off switch 188 is positioned in its on position and until a neutral switch 190 is closed as gears of the motorcycle are positioned in neutral. When a selector switch 192 is in its lowered position, a forward motor winding 194F can be energized. When the selector switch 192 is in its upper position, a reverse winding 194R can be energized. The motor windings 194F and 194R drive a reversible hydraulic pump 198. The pump 198 draws fluid from a sump 200 through a line 201. When the wheels 56 are in lowered position (FIGS. 1, 2 and full line position in FIG. 9) and the pump 198 is driven in a forward direction by the forward winding 194F, fluid is driven along the line 154 to the cylinder body 142 to cause raising of the piston rod 140 to cause raising of the locking arm to the released position 94R of FIG. 5. As the pump 198 is driven further in a forward direction, the wheels 56 are raised. If the selector switch 192 is returned to its off position when the linkages are in the intermediate position of FIG. 6, the linkages are mechanically locked in the intermediate position with the wheels 56 partially raised. When the pump 198 is driven further in a forward direction, the piston rod 140 is again raised to raise the locking lever 94 and release the mechanical lock, and the wheels 56 advance upwardly until the switch actuator 178 is actuated to open the contacts of the switch 178A and de-energize the forward winding 194F when the wheels are in the fully raised double-dot-dash line position of FIG. 9. When the selector switch 192 is advanced to its upper position, the reverse winding 194R is energized to drive the pump 198 in a reverse direction to draw fluid from the line 154 disposing the piston 150 in its lowered position (FIG. 11) so that fluid is drawn from the sump 200 (FIG. 17) through the line 128 to the interior of the inner cylinder 102 to cause raising of the piston 103 and lowering of the wheels 56 until the switch actuator 180 is engaged by the locking lever 94 to open contacts of the limit switch 180A and de-energize the reverse winding 194R. At this position, the spring 134 draws the locking arm 94 into the full line position of FIG. 5 to provide a mechanical lock to hold the wheels 56 in lowered position.

A manual release assembly can be provided for the locking arm 94. The manual release assembly includes a flexible wire 199 (FIGS. 5 and 6) which extends through a tubular guide 202. A lower end of the tubular guide 202 is mounted in an opening 204 in the housing 24 by means of appropriate nuts 206 threaded thereon. The flexible wire or cable 199 extends through an opening 208 in the locking arm 94 and has a head 209 at a lower end thereof engageable with the locking arm 94. An upper anchor member 210 (FIG. 1) is mounted on an upper end portion of the tubular guide 202 and is attached to an appropriate frame of the motorcycle. A lock actuating slide member 212 (not shown in detail) is attached to an upper end portion of the flexible wire 200 and can be drawn outwardly of the anchor member 210 to cause the head 209 to engage and raise the locking arm 94. An appropriate lock (not shown in detail) can be provided between the anchor member 210 and the slide member 212 to prevent unauthorized use of the manual release assembly.

The support system for a wheeled vehicle illustrated in the drawings and described above is subject to structural modification without departing from the spirit and scope of the appended claims.

Having described my invention, what I claim as new and desire to secure by letters patent is:

1. A support system for a wheeled vehicle which comprises a housing mounted on the vehicle, a pair of support arms pivotally mounted on the housing, means mounted on the support arms for engaging a supporting surface, a crank arm attached to each support arm, an actuator advanceable transversely of the pivots of the support arms, means linking the crank arms to the actuator, and means for releasably connecting pivots between the linking means and the crank arms to prevent relative movement of said pivots which when released move relative to one another with the crank arms to hold the support arms in a vehicle supporting position.

2. A support system for a wheeled vehicle which comprises a housing mounted on the vehicle, a pair of support arms pivotally mounted on the housing, means mounted on the support arms for engaging a supporting surface, a crank arm attached to each support arm, an actuator advanceable transversely of the pivots of the support arms, means linking the crank arms to the actuator, and means for releasably connecting pivots between the links and the crank arms to hold the support arms in a vehicle supporting position, said means for releasably connecting pivots between the links and the crank arms including a locking arm pivotally mounted on one of said pivots and a stop member mounted at the other of said pivots and engageable by the locking arm.

3. A support system as in claim 2 wherein the stop member is angle-shaped and the locking arm rests on one flange of the angle-shaped stop member and is engageable with the other flange of the angle-shaped stop member.

4. A support system as in claim 3 which includes means for urging the locking arm into engagement with the first flange of the angle-shaped stop member and means for raising the locking arm from the second flange of the angle-shaped stop member to cause release of the second flange of the angle-shaped stop member from the locking arm.

5. A support system as in claim 4 in which the means for raising the locking arm includes a reciprocatable rod engageable with the locking arm, rod supporting and guiding means cooperating with the rod, means for reciprocative raising and lowering of the rod, motive means for raising the rod in the guide means to raise the locking arm to unlocked position, and control means actuated by the motive means for directing operating power to the actuator when the reciprocable rod is in the raised position to actuate the actuator to raise the support arms.

6. A support system for a wheeled vehicle as in claim 2 which includes a stop lug mounted on the locking arm and engageable with the stop member when the support arms are in an intermediate position to lock the support arms in the intermediate position.

7. A support system as in claim 4 in which the means for raising the locking arm includes a piston rod engageable with the locking arm, a piston carried by the piston rod, a cylinder in which the piston works, means for directing fluid under pressure into the cylinder to raise the piston and the piston rod to raise the locking arm to unlocked position, and channel means in the cylinder for directing the fluid under pressure to the actuator when the piston and the piston rod are in the unlocked position to actuate the actuator and raise the support arms.

8. A support system as in claim 4 in which the means for raising the locking arm includes a flexible release cable, the release cable extending through an opening in the locking arm remote from the one of the pivots on which the locking arm is pivotally mounted, head means on the cable engageable with the locking arm, and means for drawing the cable outwardly of the housing to cause the head means to engage and raise the locking arm.

* * * * *